United States Patent
Ali et al.

(10) Patent No.: US 11,169,815 B2
(45) Date of Patent: Nov. 9, 2021

(54) METHOD AND SYSTEM FOR AUTOMATION TOOL SET FOR SERVER MAINTENANCE ACTIONS

(71) Applicant: BBY SOLUTIONS, INC., Richfield, MN (US)

(72) Inventors: Syed Waqas Ali, Woodbury, MN (US); Bryan Hunter, Eden Prairie, MN (US); Chris Cote, St. Paul, MN (US); Jason Roelofs, Blaine, MN (US); Jakob Gottlieb Svendsen, Farum (DK)

(73) Assignee: BBY Solutions, Inc., Richfield, MN (US)

( * ) Notice: Subject to any disclaimer, the term of this patent is extended or adjusted under 35 U.S.C. 154(b) by 21 days.

(21) Appl. No.: 16/248,464

(22) Filed: Jan. 15, 2019

(65) Prior Publication Data
US 2019/0220285 A1 Jul. 18, 2019

Related U.S. Application Data

(60) Provisional application No. 62/617,910, filed on Jan. 16, 2018.

(51) Int. Cl.
*G06F 9/44* (2018.01)
*G06F 11/07* (2006.01)
(Continued)

(52) U.S. Cl.
CPC ............ *G06F 9/4401* (2013.01); *G06F 8/65* (2013.01); *G06F 9/44505* (2013.01); *G06F 8/61* (2013.01);
(Continued)

(58) Field of Classification Search
CPC .. G06F 2009/45575; G06F 8/65; G06F 8/658; G06F 8/61; G06F 9/4401;
(Continued)

(56) References Cited

U.S. PATENT DOCUMENTS

| | | | | |
|---|---|---|---|---|
| 6,327,660 B1* | 12/2001 | Patel | ............... | G06F 21/575 |
| | | | | 380/277 |
| 8,296,756 B1* | 10/2012 | Feeser | ............... | G06F 8/658 |
| | | | | 717/173 |

(Continued)

OTHER PUBLICATIONS

Kazuya Yamakita et al., Phase-based Reboot: Reusing Operating System Execution Phases for Cheap Reboot-based Recovery, 2011 IEEE, [Retrieved on Jun. 24, 2021], Retrieved from the internet: <URL: https://ieeexplore.ieee.org/stamp/stamp.jsp?tp=&arnumber=5958216> 12 Pages (169-180) (Year: 2011).*

(Continued)

*Primary Examiner* — Anibal Rivera
(74) *Attorney, Agent, or Firm* — Forsgren Fisher; Daniel A. Tysver; James M. Urzedowski

(57) ABSTRACT

Embodiments of a system, methods, and other techniques and configurations for automation of computing system maintenance activities such as reboots, software installations, re-configuration, or other actions are generally described herein. In an example, an automation tool set is designed to integrate with an organization Configuration Management Database (CMDB) and other orchestration or information technology (IT) management tools to perform such maintenance actions. The automation tool set may enable and manage various forms of a workflow for maintenance actions, including a workflow designed to validate all necessary pre- and post-reboot checks, perform logging, event tracking, exception handling, notifications, incidents creation, trend analysis, customized reporting dashboards, and system adaptation. In further examples, the automation tool set may expose user interfaces, reports, and other management interfaces for control and monitoring of the workflows.

21 Claims, 10 Drawing Sheets

(51) Int. Cl.
*G06F 9/4401* (2018.01)
*G06F 9/445* (2018.01)
*G06F 8/65* (2018.01)
*G06F 9/455* (2018.01)
*G06F 9/46* (2006.01)
*G06F 8/61* (2018.01)

(52) U.S. Cl.
CPC ........ *G06F 9/4406* (2013.01); *G06F 9/44536* (2013.01); *G06F 9/455* (2013.01); *G06F 9/46* (2013.01); *G06F 2009/45575* (2013.01)

(58) Field of Classification Search
CPC ...... G06F 9/44505; G06F 9/4406; G06F 9/46; G06F 9/503; G06F 9/455; G06F 9/44536; G06F 11/008; G06F 21/105; G06F 11/1441
See application file for complete search history.

(56) References Cited

U.S. PATENT DOCUMENTS

| | | | |
|---|---|---|---|
| 8,381,264 B1* | 2/2013 | Corddry | H04L 63/10 726/3 |
| 8,473,938 B1* | 6/2013 | Feeser | G06F 8/65 717/168 |
| 8,560,694 B2* | 10/2013 | Keller | G06F 9/44536 709/226 |
| 9,082,085 B2* | 7/2015 | Joshi | G06F 9/542 |
| 9,471,331 B2* | 10/2016 | Kludy | H04L 41/08 |
| 9,590,872 B1* | 3/2017 | Jagtap | H04L 41/145 |
| 9,612,815 B1* | 4/2017 | Jagtap | G06F 8/61 |
| 10,177,988 B2* | 1/2019 | Maes | G06F 16/27 |
| 10,587,592 B2* | 3/2020 | Koya | H04L 63/062 |
| 2004/0003266 A1* | 1/2004 | Moshir | H04L 63/0236 713/191 |
| 2004/0181790 A1* | 9/2004 | Herrick | G06F 8/60 717/168 |
| 2006/0064481 A1 | 3/2006 | Baron et al. | |
| 2006/0064486 A1* | 3/2006 | Baron | H04L 41/5019 709/224 |
| 2006/0075001 A1* | 4/2006 | Canning | G06F 8/65 |
| 2006/0080656 A1* | 4/2006 | Cain | G06F 8/65 717/174 |
| 2007/0162779 A1* | 7/2007 | Downer | G06F 1/24 713/340 |
| 2007/0162785 A1* | 7/2007 | Downer | G06F 1/24 714/15 |
| 2008/0126852 A1* | 5/2008 | Brandyberry | G06F 11/0745 714/6.13 |
| 2008/0172553 A1* | 7/2008 | Childress | G06F 9/4405 713/2 |
| 2008/0215713 A1* | 9/2008 | Cannon | H04L 41/0866 709/221 |
| 2009/0112786 A1* | 4/2009 | Abels | G06N 5/025 706/47 |
| 2009/0150662 A1* | 6/2009 | Desselle | G06F 8/65 713/100 |
| 2009/0198769 A1* | 8/2009 | Keller | G06F 9/44536 709/203 |
| 2009/0228579 A1* | 9/2009 | Sanghvi | H04L 41/145 709/224 |
| 2009/0307763 A1* | 12/2009 | Rawlins | G06F 11/3672 726/5 |
| 2010/0063950 A1* | 3/2010 | Joshi | G06F 9/542 706/45 |
| 2010/0115520 A1* | 5/2010 | Kohno | G06F 9/4881 718/101 |
| 2011/0088036 A1* | 4/2011 | Patanella | G06F 9/46 718/102 |
| 2012/0042206 A1* | 2/2012 | Di Domenico | G06F 11/1441 714/15 |
| 2013/0054220 A1* | 2/2013 | Gupta | G06F 11/008 703/22 |
| 2014/0108775 A1* | 4/2014 | Kludy | H04L 41/08 713/2 |
| 2014/0189077 A1* | 7/2014 | Bauer | H04L 67/18 709/220 |
| 2014/0222818 A1* | 8/2014 | Kikuchi | G06F 16/285 707/737 |
| 2014/0250125 A1* | 9/2014 | Stuempfle | G06F 16/904 707/737 |
| 2016/0247246 A1* | 8/2016 | Bluestone | G06F 16/22 |
| 2016/0269249 A1* | 9/2016 | Maes | H04L 41/5074 |
| 2016/0352608 A1* | 12/2016 | Cornell | G06Q 10/10 |
| 2016/0378579 A1* | 12/2016 | Zhao | G06F 11/0751 714/37 |
| 2017/0168847 A1* | 6/2017 | Bombacino | G06F 8/65 |
| 2017/0257272 A1* | 9/2017 | Bauer | H04L 41/0856 |
| 2017/0345015 A1* | 11/2017 | Ranganna | H04L 41/5035 |
| 2018/0095832 A1* | 4/2018 | Pillilli | G06F 11/1441 |
| 2018/0253362 A1* | 9/2018 | Reinecke | G06F 9/45558 |
| 2018/0321927 A1* | 11/2018 | Borthakur | G06F 8/62 |
| 2018/0324159 A1* | 11/2018 | Koya | H04L 63/045 |
| 2018/0324199 A1* | 11/2018 | Crotinger | G06F 16/248 |
| 2019/0007290 A1* | 1/2019 | He | H04L 43/0817 |
| 2019/0102276 A1* | 4/2019 | Dang | H04L 67/1097 |

OTHER PUBLICATIONS

Fardin Abdi et al., Application and System-Level Software Fault Tolerance Through Full System Restarts, 2017, [Retrieved on Jun. 24, 2021], Retrieved from the internet: <URL: https://ieeexplore.ieee.org/stamp/stamp.jsp?tp=&arnumber=7945009> 10 Pages (197-206) (Year: 2017).*

"Manage device restarts after updates", [online]. Retrieved from the Internet: <URL: http://docs.microsoft.com/en-us/windows/deployment/update/was-restart>, (Jul. 5, 2017), 11 pgs.

* cited by examiner

☰ Patch Management                                                                                                        Hello, User 1

Patch Group Jobs Today - 7 AM to 7 AM

| PatchGroup | Name | Patch Date | Start Time | End Time | Computers | Created Date | Modified Date | Approved | Approval Action |
|---|---|---|---|---|---|---|---|---|---|
| Patch Group 1 | Group 1 for 6/8/2018 | 6/8/2018 | 09:00 PM | 07:00 AM | 31 | 6/8/2018 7:10:08AM | 6/8/2018 7:10:08AM | No | [Approve Job] |

Back to Previous

FIG. 5

Patch Management

| Name | Patch Date | Offset | Tiers | Description | Created Date | Modified Date | Excluded |
|---|---|---|---|---|---|---|---|
| UE01 | 5/15/2018 | 7 | 4 | | 1/10/2018 10:54:45 AM | 6/7/2018 3:45:29 PM | ☐ |
| UN02 | 5/27/2018 | 19 | 4 | Third Sunday after patch release, one week after the first Sunday session, 11pm-7am | 1/10/2018 10:54:46 AM | 6/7/2018 3:45:29 PM | ☐ |
| UN01 | 5/20/2018 | 12 | 4 | Second Sunday after patch release, 11pm-7am | 1/10/2018 10:54:46 AM | 6/7/2018 3:45:30 PM | ☐ |
| AT00 | 5/12/2018 | 4 | 4 | | 1/10/2018 10:54:46 AM | 6/7/2018 3:45:30 PM | ☐ |
| RI01 | 5/18/2018 | 10 | 4 | | 1/10/2018 10:54:46 AM | 6/7/2018 3:45:30 PM | ☐ |
| RI02 | 5/25/2018 | 17 | 4 | | 1/10/2018 10:54:46 AM | 6/7/2018 3:45:30 PM | ☐ |
| HU01 | 5/17/2018 | 9 | 4 | | 1/10/2018 10:54:46 AM | 6/7/2018 3:45:30 PM | ☐ |
| UN00 | 5/13/2018 | 5 | 4 | | 1/10/2018 10:54:46 AM | 6/7/2018 3:45:30 PM | ☐ |
| HU02 | 5/24/2018 | 16 | 4 | | 1/10/2018 10:54:46 AM | 6/7/2018 3:45:30 PM | ☐ |
| ED01 | 5/16/2018 | 8 | 4 | Temp group for testing | 1/11/2018 9:36:19 AM | 6/7/2018 3:45:30 PM | ☐ |
| ON01 | 5/21/2018 | 13 | 4 | | 1/31/2018 9:45:28 AM | 6/7/2018 3:45:29 PM | ☐ |
| ON02 | 5/28/2018 | 20 | 4 | | 1/31/2018 9:45:28 AM | 6/7/2018 3:45:30 PM | ☐ |

Back to Previous

*FIG. 6*

METHOD AND SYSTEM FOR AUTOMATION TOOL SET FOR SERVER MAINTENANCE ACTIONS

PRIORITY CLAIM

This application claims the benefit of priority under 35 U.S.C. § 119(e) of U.S. Provisional Patent Application Ser. No. 62/617,910, filed on Jan. 16, 2018, and titled "METHOD AND SYSTEM FOR AUTOMATION TOOL SET FOR SERVER MAINTENANCE ACTIONS", which is incorporated by reference herein in its entirety.

TECHNICAL FIELD

The techniques discussed herein generally relate to information technology and computing system actions and processes. The techniques discussed herein more specifically relate to monitoring and operational aspects of computing system maintenance for servers and computing clusters.

BACKGROUND

Computing systems, including those deployed in cloud-based groups of servers, often require regular software and operating system updates and other maintenance actions to address security and operational issues. Such maintenance may be needed on an ad-hoc (but urgent) basis, and may involve applying simple or complex patches or configuration changes to one or multiple software components. In many cases, as a result of patching, the affected software and operating system needs to be restarted or re-launched to enact the patch or configuration change.

One existing approach for implementing such updates involves an administrator (a human user) manually monitoring when patches are needed, controlling when and how such patches are installed, verifying that the patches were successfully installed, and manually restarting or re-setting the state of the affected software or operating system to continue system operation. Another existing approach for implementing such updates involves pre-scheduled automation, where patches are installed on a particular system at a predetermined time which is followed by automatically restarting the particular system. However, in complex, high-availability settings, use of manual approaches may result in system deficiencies or vulnerabilities, due to the extensive amount of user time and resources needed to update a system; in complex, high-availability settings, use of pre-scheduled approaches for installing software updates may result in service interruptions and unexpected failures or system behavior if the updates are unsuccessful. As a result, software update processes are often delayed in complex or high-availability environments until such processes can be fully overseen by human users, leading to system downtime or security risks until an administrator or other human resource can oversee the action.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 5 and 6 illustrate respective graphical user interfaces for listing and controlling patching operations, according to an example;

DETAILED DESCRIPTION

Figure 1:
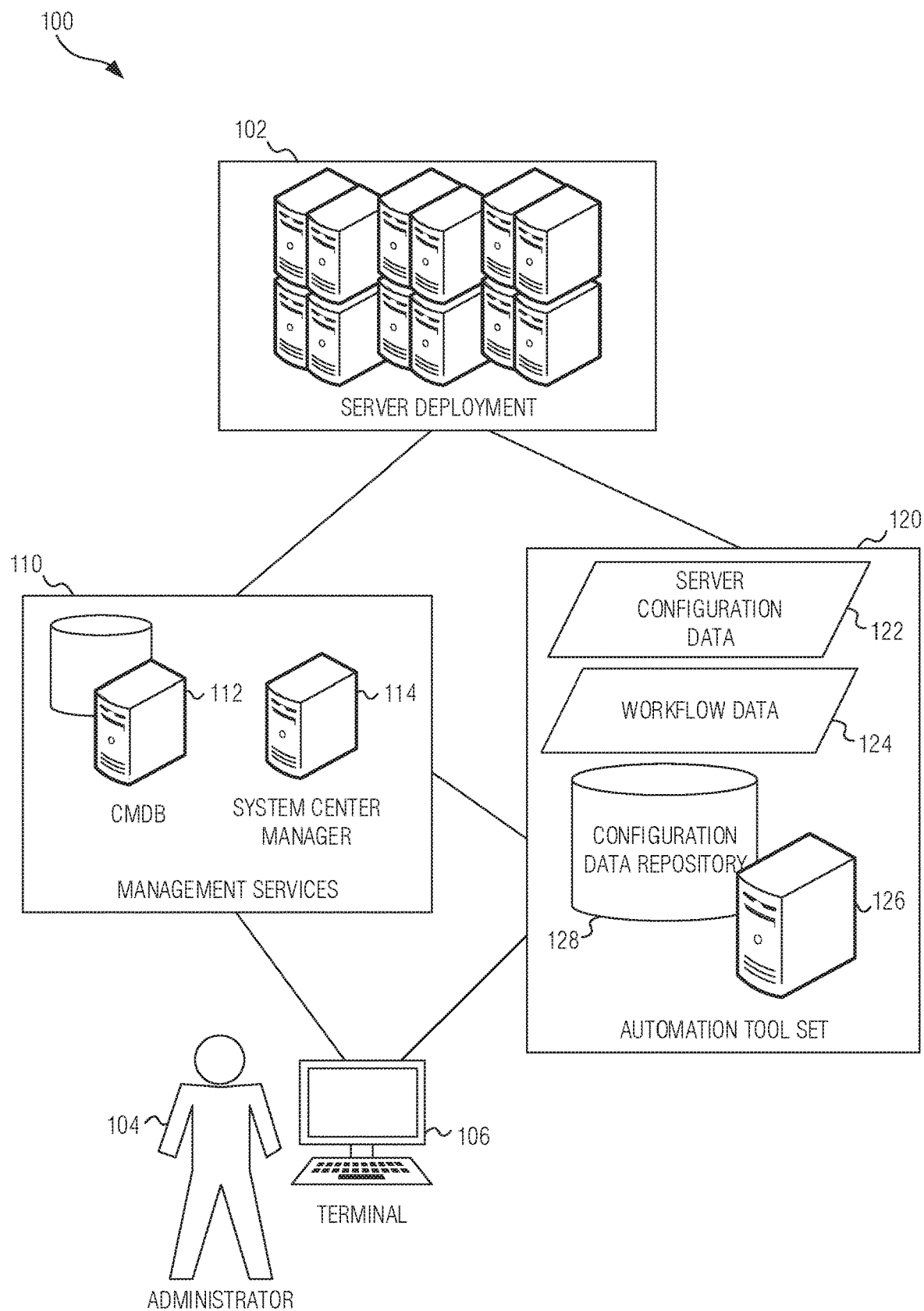
FIG. 1 illustrates an overview of a computing system automation platform, according to an example.

The present disclosure provides examples of an automation tool set which may be utilized for implementing maintenance actions in various forms of computing systems. Such maintenance actions may include, but are not limited to, performing reboots or restarts of computing systems and associated software after software updates have been installed; verifying the configuration or operational state of an operating system, virtual machine, software application, service, or other executable process or subsystem; performing logging and analysis of system and process availability, in connection with the update or configuration change; and other aspects of updating or modifying operational services on a computing system or platform.

The present techniques specifically enable software patches and configuration changes to be deployed more accurately and in a much faster manner over conventional manual or automated approaches. These technical improvements include: the reduction of time and human oversight, leading to reduced incidence of human error and faster deployment of security fixes; increased accuracy and identification of update operations; improved verification of system states, prior to, during, and after update operations; and improved automation to handle unsuccessful updates or other incidents. All of these technical improvements may lead to an increase in computing system performance (and processor, memory, and computing resource usage) over conventional techniques.

In conventional approaches involving a Microsoft Windows server environment, an administrator may utilize System Center Service Manager (SCSM) and System Center Configuration Manager (SCCM) services to observe the status of operating system updates for various monitored systems. An administrator may manually monitor SCCM reports and reboot individual servers when such servers show that a patch has begun or completed an install, and has progressed to a "pending reboot" status. After identifying a server with this "pending reboot" status, the administrator will often kick off or schedule actions (such as with a PowerShell script) to reboot the server. The administrator then must notify application teams, such as via email, regarding the application of the patch; the administrator and any responsible application teams must validate success of the patch after the server reboot, such as to validate that services are operating in an expected state. Thus, in this scenario, the administrator is responsible for manually refreshing server statuses, and tracking or controlling available server reboot time periods for every server or application affected by the update. The remediation of unhealthy SCCM clients or the installation of an SCCM client on a server is manually performed; if there is a patch failure, the administrator must troubleshoot the failure directly or contact an IT support team to determine why the patch failed. Thus, with conventional approaches, significant cost, complexity, and manual action must take place to perform even a simple restart of a server. The results of such changes and actions thus are dependent on the expertise and attention of the administrator and IT support staff.

With the present tools and techniques, an automation tool set may be deployed to provide increased control and precision of software and configuration update and launch processes through specialized workflows. Such specialized workflows may be used to validate all necessary pre- and post-reboot checks, while offering extensive logging, event tracking, exception handling, notifications, incident creation, trend analysis, customized reporting/dashboards, and a control with the ability to stop the entire workflow if needed. The automation tool set may be deployed to integrate with features of SCSM. SCCM, System Center Operations Manager (SCOM), or other operational or configuration tools in Windows, Linux, or other OS operating system (OS) environments. For instance, the presently described automation framework enables the creation of corresponding "Maintenance Windows" in SCCM for a patch install and reboot trigger (for each update Tier), in addition to controlling an approval for a job which matches a patch install date.

In a further example, the present automation tool set may integrate with a configuration management database (CMDB) which is used by an organization to track IT assets and configuration items within the system infrastructure. Due to this integration, the automation tool set does not need to be the system of record (e.g., "own" or control) all the configuration items that are affected by the software update or configuration change. Further, the automation tool set does not need to serve as a standard corporate CMDB nor copy or replicate all the company's standard CMDB data into a separate database. Rather, the present automation tool set may connect to any CMDB (given that it is coded to do so), leverage the existing data in such CMDBs. and access and store only that data which is necessary to perform the desired automation function on a particular computing system.

In an example, the present automation tool set provides a lightweight interface that integrates with and enhances operation of a CMDB with configuration and update results. The automation tool set may also be used to design and build automation workflows, including automations that supersede those in use with an orchestration tool (e.g., Microsoft System Center Orchestrator, "SCORCH"). The present automation tool set may also provide automations that call or effect automation flows within, or coordinated with, such orchestration tools.

Also in an example, a user interface may integrate with the present automation tool set to provide detailed information and reporting regarding features or results of an automation workflow. For instance, a web UI dashboard may track and display successes or failures for each step within a particular automation. These and other types of user interfaces and integration approaches will be apparent from the following description.

FIG. 1 illustrates a simplified overview of a computing system automation platform 100 according to an example. As shown, the system automation platform 100 includes a server deployment 102, various management services 110, and an automation tool set 120. The system automation platform 100 may also include control or monitoring interfaces, such as a terminal 106 used for control and modification, by an administrator 104, of the management services 110 and the automation tool set 120.

The automation tool set 120 may implement one or more automated workflow processes for management of the server deployment 102 and associated services and sub-systems operating on the server deployment 102. As one example, an automated workflow process may include an automated reboot sequence which is initiated in response to operating system or application patching (e.g., required as a result of applying a security patch). The automated workflow process may be performed by a computing system 126 operating the automation tool set 120 based on server configuration data 122, workflow data 124, or a configuration data repository 128.

In an example, an automated workflow process may be used by the automation tool set 120 to automate a server reboot process (a mandatory task conducted after Windows operating system patching) of servers in the server deployment 102 in a highly controlled manner, including to validate all necessary pre- and post-reboot checks, and perform extensive logging, event tracking, exception handling, notifications incidents creation, trend analysis, and customized reporting/dashboards. Further, the automation tool set 120 provides the ability to stop or modify the entire workflow if needed.

At a high-level, the automated workflow process fetches data from multiple data sources of the management services 110 (e.g., a system center manager 114 such as SCCM, a ServiceNow platform, Active Directory servers, a Web UI, or Endpoint Servers) such as using System Center Orchestrator (SCORCH) Runbooks. This data is populated into a data store (e.g., configuration data repository 128) accessible to the automation tool set. This configuration data repository 128 operates as a configuration item (CI) database, to collect and organize information about computing nodes and services in a similar fashion as a CMDB (e.g., CMDB 112). However, the configuration data repository 128 itself is synchronized with the CMDB 112 and is able to access organizational information about the various systems and services affected by the workflow process.

The automated workflow process further creates and/or updates all required maintenance windows for defined sets of servers, and initiates actions to ensure that tasks are scheduled and also successfully execute. For example, the automated workflow process may initiate respective actions and sequences, such as a SCCM Task Sequence, to conduct the actual server reboot. The process flow further coordinates all necessary steps for pre- and post-reboot validations, calling needed runbooks, while logging all client side activities into the configuration data repository 128 (e.g., using SCORCH Web Service calls, which ultimately calls a runbook). Further explanation of an example update process is provided in the data flow and sequence diagrams of FIGS. 3 and 4, discussed below.

The automation tool set 120 further enables the use of several configuration items available to validate client readiness state for performing the automated action (e.g., validating, pre-reboot, that services within the system are available to restart), and after the automated action (e.g., validating, post-reboot, that the system has successfully performed the action and that services may be restarted). Such validation may include considering any number of dependencies, settings, prerequisites, or requirements, for the operating system, virtual machines, services, applications, and the like.

Figure 7:
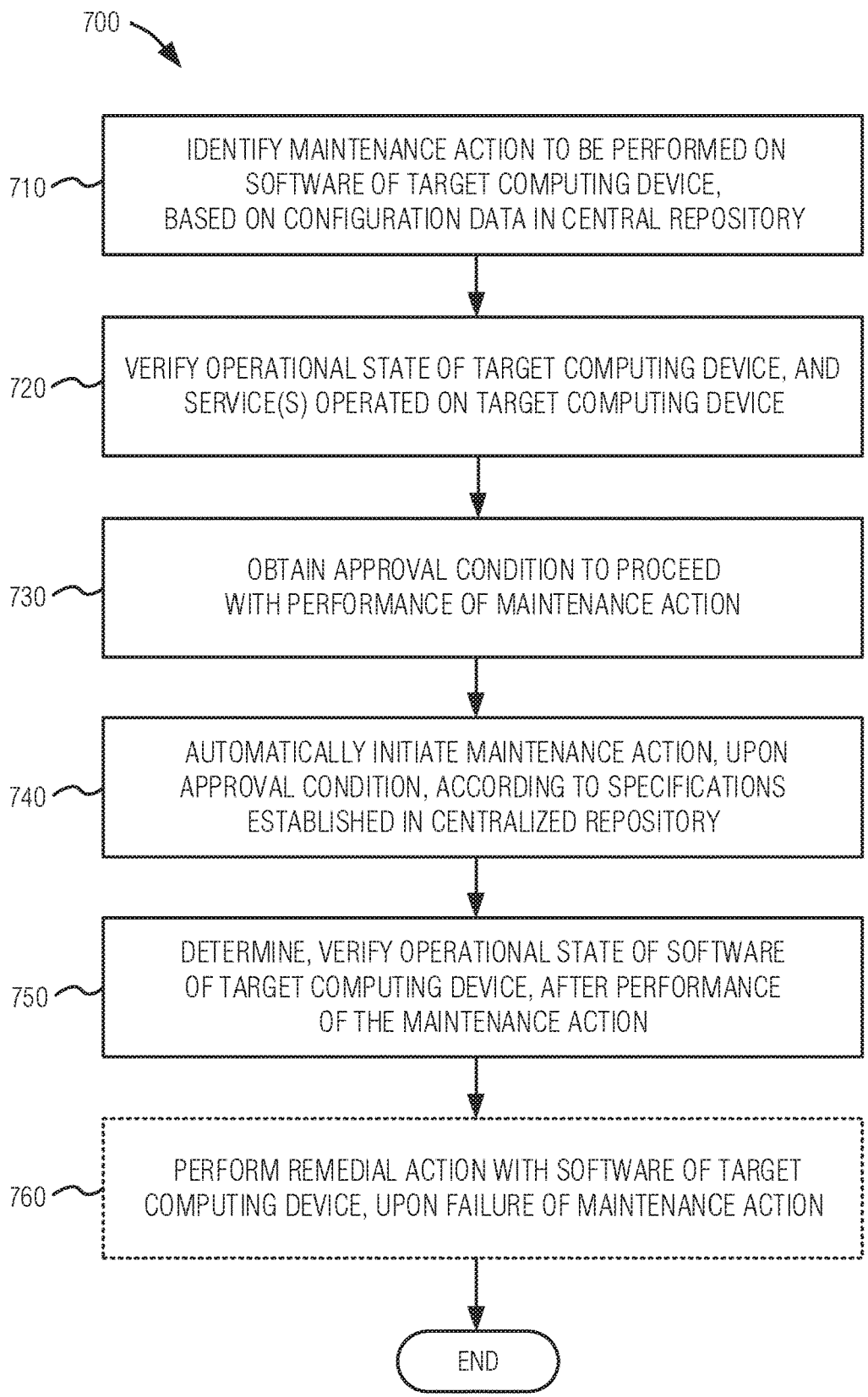
FIG. 7 illustrates a flowchart of an example method for deploying maintenance actions onto a target computing system using an automated tool set, according to an example.

The automation tool set 120 may also provide a user interface and dynamic outputs (e.g., via the terminal 106) to enable administrator monitoring and control of actions. The automation tool set 120 may host or generate custom UIs for additional data input and approvals or changes from the administrator 104. The automation tool set 120 may also provide custom reports/dashboards available for real-time tracking of patch and/or reboot status, and an indication of overall compliance status. Further explanation of example dashboards and reports are provided in FIGS. 5 to 7, discussed below.

The automation tool set 120 may also include various features to enable logging and handling of actions within the workflows. For instance, the automation tool set 120 may record the success or failure of each sub-process within an automation workflow and launch conditional remediation automation workflows. A task sequence which has led to a failure or issue also may lead to corresponding runbooks for a ServiceNow incident or a change record creation (e.g., within the management services 110).

In an example, the automation process for an OS restart may be enacted by control of the patching process, with use of the automation tool set 120 to oversee the installation of the patches and coordinating of the pending reboot state. For instance, the automation process may be specified to not reboot a computing node unless the node is in an expected (correct) compliance state. The automation process may also check the client to ensure that all of the prerequisites are in place, such that if some critical services are running, a snapshot is obtained, and data is logged or reported.

In an example, the automation process for the OS restart proceeds by obtaining data, relevant to the update of the computing nodes, from a CMBD (e.g., CMDB 112) which manages or tracks the various computing nodes. This data is placed into a centralized repository (e.g., configuration data repository 128) accessible by the automation tool set 120. This information is augmented by adding additional attributes (e.g., from the management services 110) that are used to modify or drive the workflow. The workflow is then used to transition to a reboot state and a post-reboot state.

Custom logging may be utilized to track various actions in the configuration data repository 128 or other locations, including in the form of extensive logging to identify which process has rebooted, when the process has started, and how. As an example, data from a CMDB in ServiceNow may be used to track configuration items, including atomic items such as servers. Rather than bringing in a new CMBD, the automation tool set 120 may be used to leverage the existing CMDB data for the tasks. In this fashion, the automation tool set 120 may be configured to provide system data that is not inconsistent, or duplicative, without needing to identify or track which CMDB or service is the system of record. Accordingly, in some examples, a small amount of information may be maintained in the configuration data repository 128, while using the CMDB features (such as CI tickets in CMDB 112) to track configuration properties.

The automation tool set 120 may integrate with CIs maintained in the CMDB 112 for a particular resource, to find out who supports the resource, and who is the manager of the resource. This data may be leveraged into reporting, compliance, and notifications, to dynamically ultimately assign incidents, find related servers and resources, and change workflow actions. The automation tool set 120 may also access features of a product capability manager (PCM) and other information about application ownership, to enable customized actions and activities in the automation workflows.

The automation tool set 120 may maintain other data in addition to the centralized configuration data repository 128; the automation tool set 120 may also provide a staging table, to run and execute staged or pre-tested workflows (e.g., on a staging portion of the server deployment 102) before operating on a live system environment. Further adaptation may be used to integrate the automation tool set 120 with cloud service management tools, such as ServiceNow; ServiceNow may also pull information from the automation tool set, and set maintenance information or actions accordingly.

The automation tool set 120 may also provide aspects of activity logging and dashboards, including trending analysis, in generated user interfaces (e.g., via the terminal 106). For instance, a report may be generated to identify a state of a group of services, along with trending data for such services. Report customization and logging and user interface functionality may also be provided within a system. Conventional tools such as SCCM provide a limited level of real-time compliance data, but track how a server was patched at an earlier time (e.g., 3 months ago). The automation tool set 120 may store logging data in the custom repository or other data stores, to track trending issues and state changes. In this fashion, the automation tool set 120 is not limited to performing pre- and post-validation activities, but rather, the automation tool set 120 can apply additional service and system health validation concept as part of an automation validation. The automation tool set 120 may also implement aspects of remediation, including remediation workflows to restart services, systems, and enact corrective actions.

Figure 2:
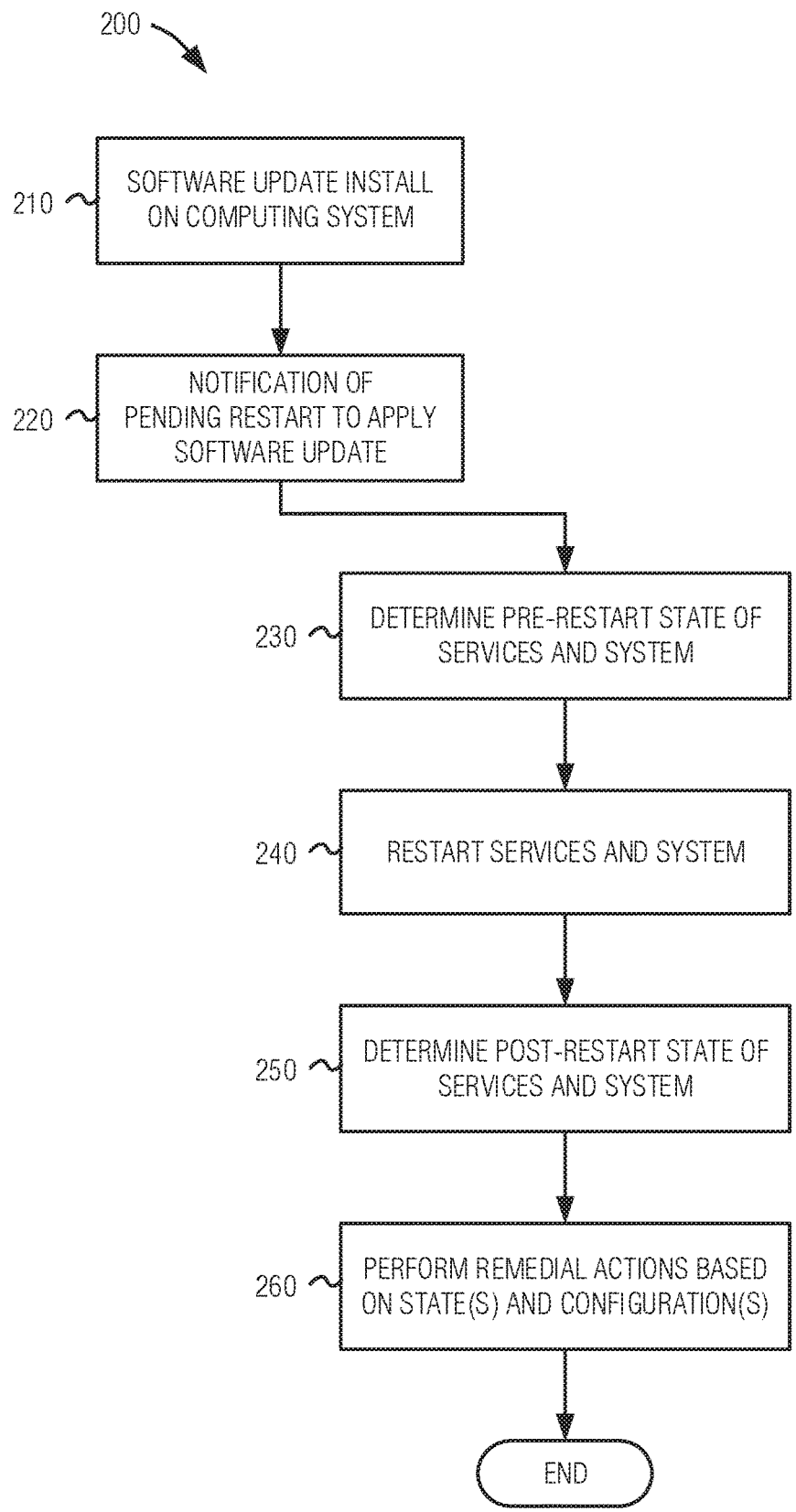
FIG. 2 illustrates a flowchart of an example use of an automation tool set configuration for a software update process, according to an example.

FIG. 2 illustrates a flowchart of an example use of an example automation tool set configuration for a software update process (e.g., for an operating system update, performed with the automation tool set 120). A software update install is performed on the computing system (operation 210), which results in a notification (operation 220) of a pending restart needed to apply the software update. The automation tool set operates to determine a pre-restart configuration state (operation 230) of services on the computing system, and the system itself. The automation tool set launches a restart of the computing system and affected services on the computing system (operation 240). The automation tool set then determines the post-restart state of the system and the affected services (operation 250). Based on this determination, and the resulting state(s) and configuration(s) of the services and computing system, the automation tool set may perform one or more remedial actions on the services or system.

With use of the automation tool set, patches may remain deployed and installed at an automated installation time, including with the use of mass deployments that are coordinated with releases of patches from system or operating system manufacturers. However, instead of going into each server collection and setting a maintenance window and a task window, the maintenance task (e.g., for restarting) is being automated. Before, such tasks would need to be manually set up and based on each maintenance window. With conventional approaches, a system administrator would need to monitor the update report for a set of servers, identify that these are pending reboot, and then reboot them in an ad hoc fashion. The automation tool set adds the capability to do validations and checks, while also deferring manual report review and actions.

If issues are identified with an automation workflow, then auto-incidents and notifications may be automatically provided from the automation tool set to a variety of destinations, including those of the management services (e.g., services 110). This provides a significant benefit over manual user monitoring and communications, followed by an administrative or IT user notifying that a service has been resumed. The automation workflow may also be launched in a staggered or delayed fashion to minimize impact on an operational deployment, which provides significant benefits over automatically restarting a large number of the operating systems or services at a scheduled time. Such delays and prerequisites may be implemented in conjunction with special handling workflow or system/service handling requirements.

The use of the automation tool set accordingly eliminates the manual process of rebooting servers and restarting applications in an often-complex enterprise environment while adding automated additional pre/post check validations and notifications. This increases accuracy and uptime, and the need for troubleshooting many common scenarios involving service interruption and mis-configuration as a result of system updates. The presently described tool set may also avoid the need to acquire or maintain another CMDB, or avoid the use of separately maintained data that becomes out of date. Thus, the automation platform does not require a new CMDB as it can pull data from virtually any type of database. Further, the automation platform may operate as a very lightweight solution that relies more on SCCM and less on SCORCH than traditional products.

The use of the automation tool set may not necessarily reduce the amount of time to deploy patches; however, the increased customization may reduce the chances for errors or system interruption, or issues caused by human error or oversight. Thus, instead of relying on an administrator to go into each server collection and define a maintenance window and schedule a task action, such windows and actions may be automated.

The automation tool set may also introduce a capability to perform validations and checks, without the need for manual report monitoring. Accordingly, if issues are encountered in an update workflow, for example, that are not addressed with a remediation workflow, then the automation tool set may launch an auto-incident. Such an incident may include sending notifications to appropriate monitoring personnel and affected entities. This provides a significant benefit over existing techniques, where if the services are not successfully re-launched, then an administrator must manually communicate this information to affected entities. Thus, the configuration of the automation platform as described herein may provide significant proactive benefits over manual actions and activities.

In further examples, an automation tool set may be integrated to distribute workflows among tiers of systems or services, and enact automation for such systems. The automation tool set may integrate with a self-service portal where an administrator may define, specify, and distribute workloads for the maintenance action. Also in a further example, the automation tool set may manage a specific group of servers has a reboot order/dependency. Also in a further example, maintenance actions taken with the automation tool set may be deployed first with the lower test environment followed by production environment. Other variations for deployment, testing, and verification of configuration changes to service and system configurations will be apparent.

Figure 3:
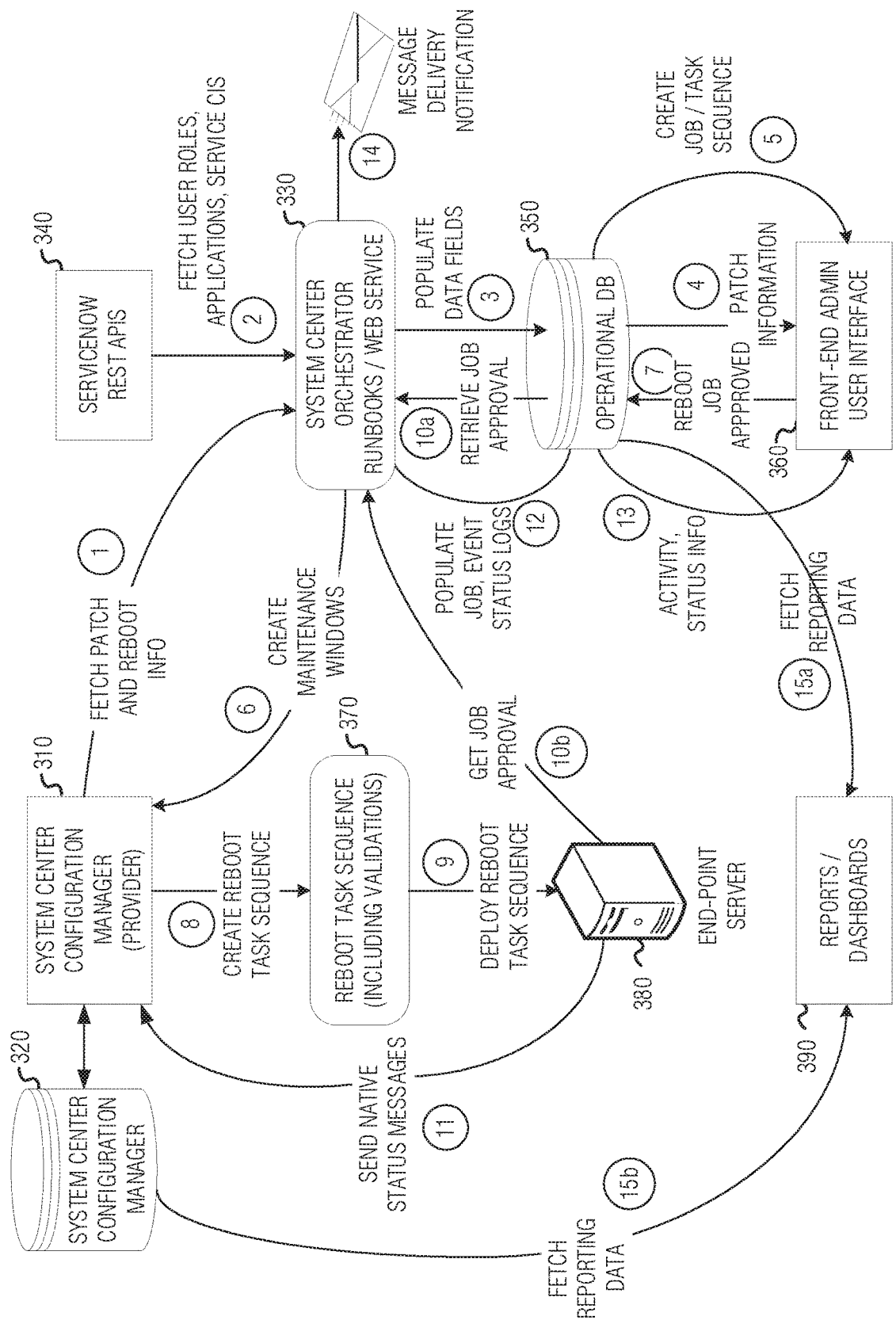
FIG. 3 illustrates a data flow diagram of a patch and reboot automation process, according to an example.

FIG. 3 illustrates a data flow diagram of an example patch and reboot automation process, applied with use of the automated tool set discussed herein. The actions of the automated tool set are shown as actions and data processes being deployed among multiple entities. Thus, although a specific orchestration component is not illustrated in FIG. 3, it will be understood that the following operations (numbered 1 to 15*b*) may be coordinated from a central orchestration component or actor.

The patch and reboot process of FIG. 3 commences at operation (1) with the retrieval of patch and reboot information, performed by a configuration provider (e.g., SCCM) 310, to an orchestrator (e.g., SCORCH) 330. This patch and reboot information may also include reboot tier information, indicating the collections and members of servers relevant for updating. The orchestrator 330 also obtains information at operation (2) regarding user roles, applications, and service configuration information, as retrieved from an IT services management system 340, such as exposed via ServiceNow RESTful APIs. Based on the system, application, user, and service information, relevant data fields in the operational database 350 for the automation tool set may be populated, at operation (3).

The patch information may be exposed to an administrative user at operation (4) in a user interface 360, and further operations may be performed via the user interface to establish the job, or define the task sequence for the job, at operation (5). The information specified for the job may be propagated to the configuration provider 310 to create a maintenance window, at operation (6), and instructions may be further communicated via the user interface 360 (as initiated from an administrative user) to approve the specific job or task sequence in operation (7).

With the approval available, a reboot task sequence 370 is established at operation (8) by the configuration provider 310, and is deployed at operation (9) at the appropriate time on the endpoint server 380. The endpoint server 380 further coordinates with the orchestrator 330, to verify approval, as indicated in operations (10*a*). (10*b*). The endpoint server further coordinates with the configuration provider 310 to accomplish the relevant maintenance action (e.g., a reboot), and provides any status message in a native format at operation (11) to the configuration provider 310.

Upon success of the update, various operations are performed to communicate the event status. This includes: populating the job and event status logs, from the orchestrator 330 to the operational database 350, at operation (12); communicating the activity and status information from the operational database 350 to the user interface 360, at operation (13); providing a message, regarding the status of the job execution, at operation (14); and outputting the reporting data regarding the task and activity status, and configuration status of various servers, systems, and services, via reports or dashboards 390 at operations (15*a*), (15*b*).

Figure 4A:
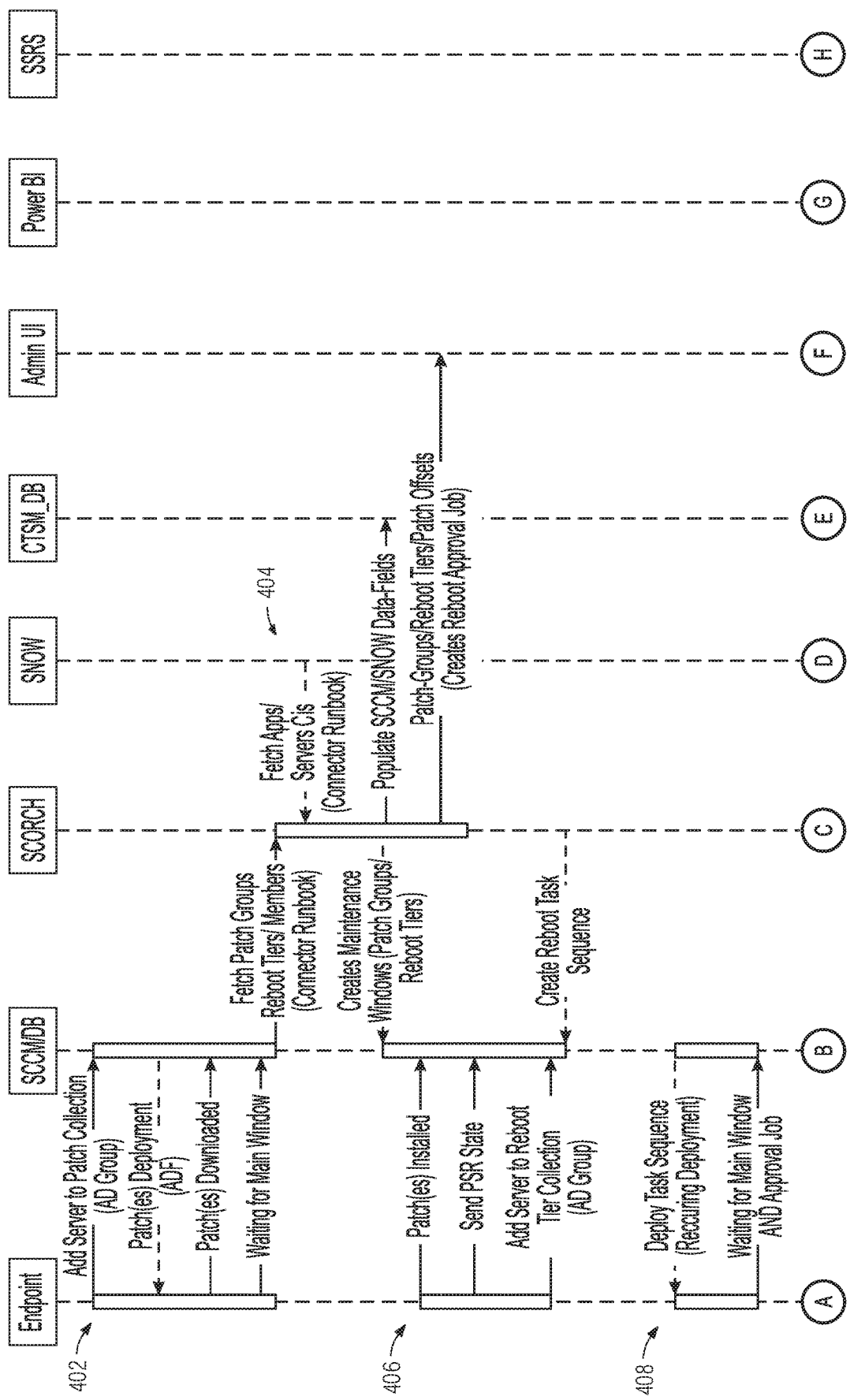
FIGS. 4A and 4B illustrate a sequence diagram of a patch and reboot automation process, according to an example.
Figure 4B:
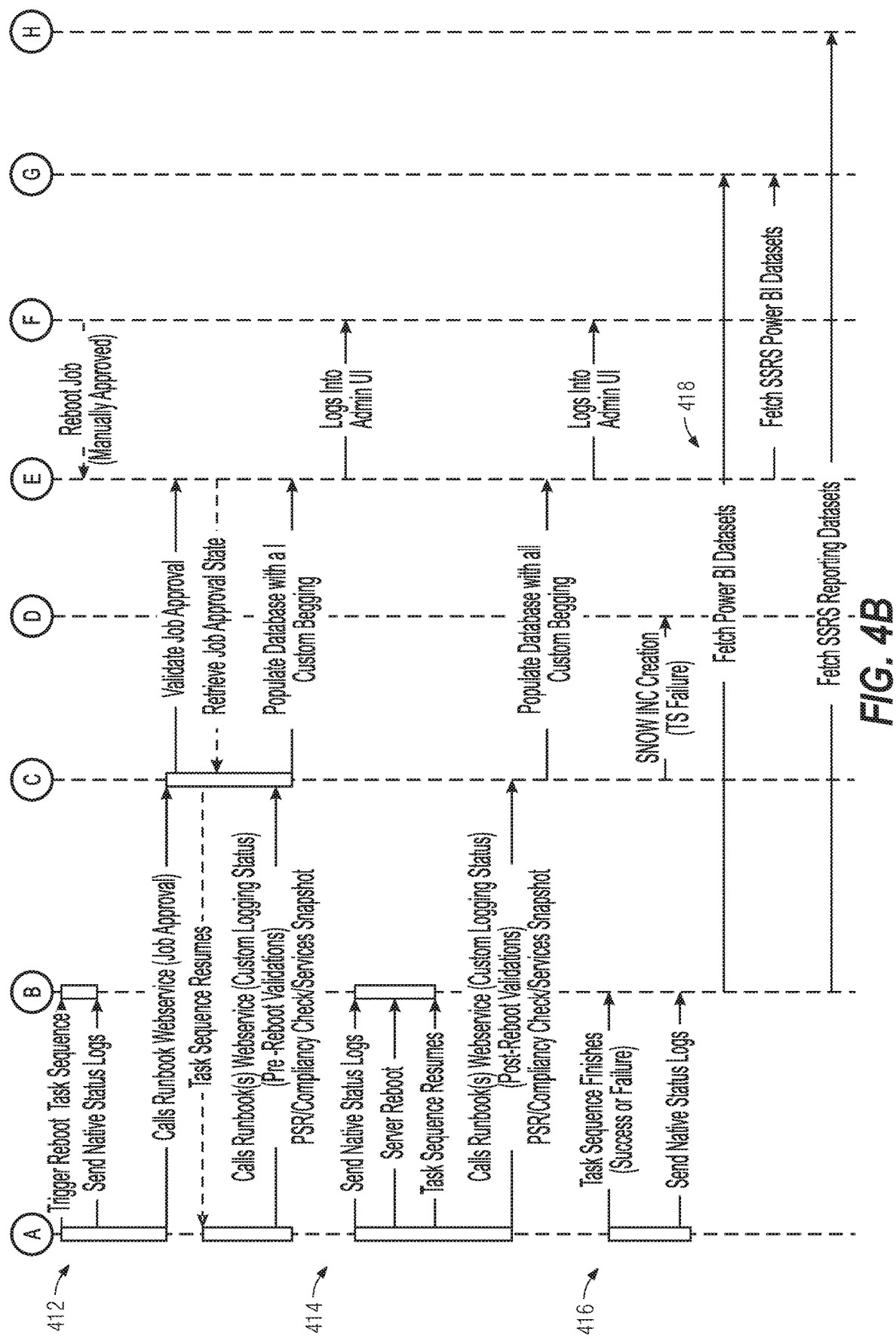

FIGS. 4A and 4B illustrate a sequence diagram of an example patch and reboot automation process, specifically to perform a reboot of a target endpoint computing system according to the approaches discussed above for FIGS. 1 to 3. In this example, the endpoint computing system is a Windows-based computing system, and is managed by a number of Microsoft-based configuration systems (e.g., SCCM 420, SCORCH 430, etc.).

Specifically, the sequence diagram illustrates a scenario where operations are coordinated among a SCCM 420 platform, a SCORCH 430 orchestrator, a Service Now (SNOW) configuration management instance 440, and an operational database (CTMS_DB) 450, for control and management of reboot and other maintenance tasks on a Microsoft Windows endpoint server, at endpoint 410. Operations are further depicted as being coordinated among an administrator user interface 460, a reporting platform 470 (e.g., Power BI), and reporting service 480 (e.g., SQL Server Reporting Services (SSRS)).

The initial operations 402 between the server endpoint 410 and the SCCM 420 include, an initial step to add the server to a patch collection or group, deploying one or more patches to the server, downloading the patches and waiting for use of a maintenance window. The SCCM instance 420. SCORCH instance 430. SNOW instance 440, and CTMS data store 450 coordinate additional operations 404 to deploy patch groups (including tiers and members), and obtain configuration information for various applications and servers, as this configuration information is populated within the CTMS_DB 450. Based on the configuration information, various patch groups, tiers, offsets, and other collections of work may be exposed in the administrative user interface 460 (including an ongoing status of installation).

The operations 406 continue to coordinate the actual patch installation among the various groups and tiers defined in one or more maintenance windows, ultimately leading to the installation of patches at the endpoint 410, and the communication of a patch install state from the endpoint 410 to the SCCM 420. At this point, the patch has been deployed at the endpoint, but a reboot must occur for the patching operation to complete. The server is then added to a reboot tier collection, which can be managed via a reboot task sequence by SCORCH 430. The SCCM 420 then may deploy this task sequence, subject to the approval of the maintenance operation (here, reboot of the server).

The operations 408 illustrate how an administrator may provide approval of the maintenance operation using the administrator user interface 460. Based on this approval, the SCCM 420 may coordinate with the endpoint 410 to trigger the reboot task sequence, and begin initial logging of the state of the endpoint 410 and any services. Through use of SCORCH 430, an approval to proceed with the restart may be validated, using information stored in the CTMS data store 450. Additional logging and pre-reboot validation may be performed, and information regarding the state of the services may be stored in the CTMS_DB 450. At this point, assuming that validation and logging has been successful, the reboot task may continue.

The operations 412 also continue with the server reboot, and the performance of the task sequence, moving towards completion. Logging information for the status of the reboot is then communicated to the SCORCH orchestrator 430, with operation 414, with logging information then forwarded to the CTMS data store 450. This status information may be exposed for visibility in the administrative user interface 460.

The operations 416 at the endpoint conclude as the task sequence finishes, to indicate success or failure, with native status information being provided to SCCM 420. In the event of a task sequence failure, SCORCH 430 may also coordinate information with the SNOW 440 as part of an incident creation process.

Finally, the operations 418 among the entities 420, 430, 440, and 450, communicate status information regarding the task status, and configuration information regarding the subject maintenance action, to a reporting dataset. In an example, these data sets are parsed by the reporting platform 470 to generate usable reporting output, including graphical representations. Further reporting datasets may be communicated to the reporting service 480 for additional processing and storage.

FIGS. 5 and 6 illustrate respective graphical user interfaces for listing and controlling maintenance operations, and specifically, patching restart operations (such as restart operations illustrated in the specific flows of FIGS. 3 and 4). It will be understood that these graphical interfaces are provided for purposes of illustration, and that different data fields and controls or representations may be exposed through similar user interfaces to administrative or technical users.

For example, FIG. 5 illustrates how a patch group (a group of a number of computing systems) may have a specific maintenance job or task that is available to deploy. An administrative user may provide approval for this maintenance job, which causes the relevant maintenance actions of the job to be approved and scheduled. In some examples, the maintenance job may be associated with pre-defined (or automatically suggested) start times and end times at a future point. Thus, an administrator can approve a job for execution during a low usage period, and allow the configuration platform to manage the execution and coordination of the maintenance actions during this low usage period. If all of the subject computers of the patch group are not able to conduct the job within the predefined time, then the user interface may provide additional options or information to allow remediation.

As a further example, FIG. 6 illustrates a list of patch groups, including a list of information relevant to conducting a particular maintenance action at the task group. For instance, the list of patch group may indicate a name of a group, a time and date of creation of the group, an offset for conducting operations with the group, a number of tiers within the group, a description of the group, and a creation or modification date associated with the group. The user interface may also include the ability to exclude a particular job, type of job, or type of maintenance action (or all maintenance action) from use with a particular group.

In an example, there may be multiple tiers or subsets of a patch group which have specific reboot windows within their group. For example, consider that Group 01 is a group of servers scheduled to be patched on Monday night, with four Tiers: A, B, C. and X. These Tiers are used to configure maintenance windows which control when the reboot process is allowed to take place (e.g., Tiers A/B/C/X are respectively: 12 AM-2 AM, 2 AM-4 AM, 4 AM-6 AM, and Excluded from reboot automation). The Tier identifier also may be amended to the patch group name to define the Tier name (01A, 01B, etc.).

In further examples, a graphical representation may be generated, based on performing a specific maintenance action with individual computing machines, with different groupings of the computing machines. For instance, the graphical representations may show which servers (in one or more different groups of servers) have had the maintenance action successfully deployed, and statistics regarding the number of servers which were excluded. Also for instance, servers or specialized machines may be represented differently from individual workstations (with the workstations separated into different groups). Thus, although many of the previous examples were provided with reference to servers, it will be understood that individual workstations, personal computers, mobile electronic devices, and the like, may also be managed by the configuration platform discussed herein.

FIG. 7 illustrates a flowchart 700 of an example method for deploying maintenance actions onto a target computing system using an automated tool set, such as described with reference to the tool set or platform discussed above in FIGS. 1 to 7. In an example, this method may be used to accomplish a controlled maintenance scenario for a reboot or restart of a particular server, virtual machine, instance, or other system, to perform such a maintenance action without direct human control but while enabling several safeguards. Such safeguards may include: rebooting a target server only if a server is in a pending system restart condition; evaluating a reboot tier status to ensure that only in-scope servers are rebooted; and use of approval conditions to ensure that the maintenance action is only applied to authorized locations.

The flowchart 700 commences with an operation at 710 to identify a maintenance action (e.g., a reboot) to be performed on software of a target computing device (e.g., a server instance). This maintenance action may be identified based on configuration data maintained in a central repository (e.g., data store 128 or 350, discussed in the examples above) associated with the automated tool set. This central repository may be populated with configuration data for the target computing device, that is obtained from multiple configuration data sources. In various examples, these data sources may include the data stores operated by administrative or management entities (e.g., the CMDB 112, the system center manager 114, the provider data 310, 320, etc.). In specific examples, the maintenance action is a reboot or restart of an operating system of the target computing device, and the maintenance action is required (e.g., for security or deployment reasons) after installation of a software update on the operating system of the target computing device.

The flowchart 700 continues at operation 720 with the verification of an operational state of the target computing device, and verification of the services operated on the target computing device, prior to attempting the performance of the maintenance action. This operational state may specifically relate to the state of at least one service (e.g., operational state, execution state, status, etc.) operated by the target computing device. In specific examples, the maintenance action is performed as part of a maintenance workflow enacted by the automation tool set, as specifications for the maintenance workflow are stored in the centralized repository. These specifications may be used in settings where the maintenance workflow conducts actions such as: event tracking for the maintenance action, exception handling for the maintenance action, and notification regarding a status of the maintenance action. The maintenance workflow may also involve use of at least one automation flow established within an orchestration tool, even as the automation tool set operates independently from the orchestration tool.

The flowchart 700 continues at operation 730 to obtain an approval condition to proceed with a performance of a maintenance action. For instance, this approval condition may be provided or specified by an administrator, supervisor, or other manager. In a further example, the centralized repository used by the automated tool set tracks the approval condition, and further operations are performed for obtaining an approval command from the administrator (e.g., received via a user interface) to proceed with performance of the maintenance action.

The flowchart 700 continues at operation 740 to automatically initiate the maintenance action, upon detection of the approval condition, and to perform the maintenance action based upon the specifications or conditions for the maintenance action that are specified in the centralized repository. These specifications or conditions for the maintenance action may be directly or indirectly derived from the information obtained from administrative or management entities, such as which systems can be updated, in what order to perform an action on a system, which services need to be started or restarted, dependencies on the maintenance action, and the like.

The flowchart 700 continues at operation 750, at a point after the attempted performance of the maintenance action, to determine and verify the operational state of the software of the target computing device. The verification of the operational state of the target computing device may include verifying the state of the at least one service, after performance of the maintenance action. This verification may ensure that the pre-maintenance condition of the system, server, or service can be continued and resumed. If the maintenance action was successful, further processing may be performed (such as to commence the maintenance action on another system, or system group, to notify an administrator, to log information, etc.), or processing may be completed.

The flowchart 700 continues with an optional step at operation 760, if failure of the maintenance action occurs, to perform a remedial action with the software of the computing device. Thus, in this example, verifying the operational state of the target computing device is followed by performing remediation on at least one service of the target computing device, based on the detection of a failure operational state for the maintenance action with at least one service.

In further operations (not depicted), a status report of maintenance actions, success status, or failure status, may be generated. For instance, this may include generating data to output a status report of the maintenance action, using the configuration information in the centralized repository. Such a status report may indicate or identify the operational state of the target computing device after performance of the maintenance action.

Figure 8:
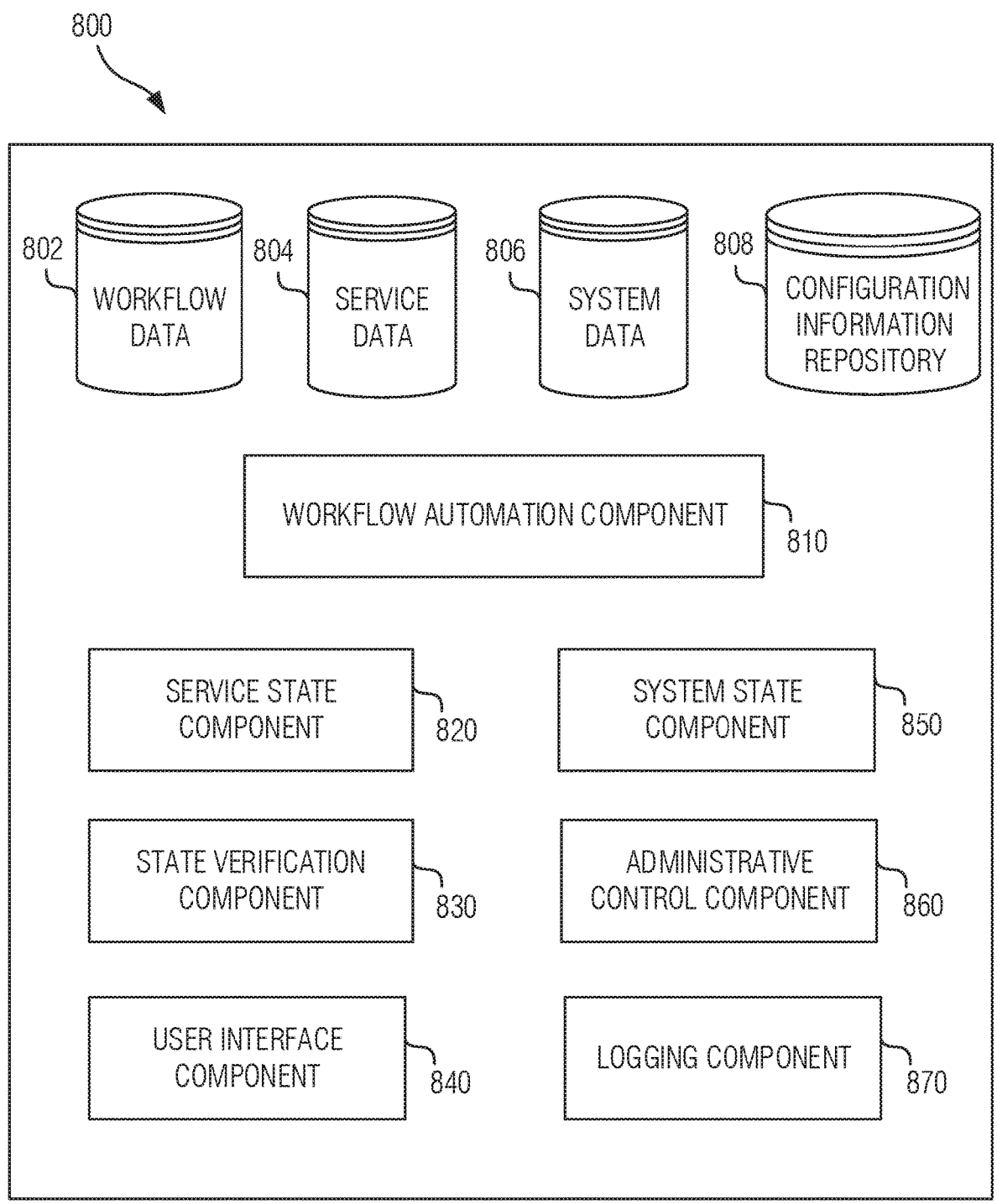
FIG. 8 illustrates a component diagram for deployment of an automation tool set system, according to an example.

FIG. 8 illustrates a component diagram for deployment of an automation tool set system 800. In an example, the automation tool set system 800 maintains various data sources related to configuration and operation characteristics of the affects services and systems, including workflow data 802, service data 804, system data 806, and a configuration information repository 808. These data sources may include the configuration and workflow data discussed above (e.g., provided among data sources 122, 124, 128, entities 310, 320, 330, 340) or in additional forms of data and interfaces.

Also in an example, the automation tool set system 800 operates respective components to implement the functionality described above. These respective components may include, a workflow automation component 810 to define, execute, and modify automated workflows; a service state component 820 to transition (e.g., modify, change, stop, start, restart) a particular computing service into a defined state: a system state component 850 to transition (e.g., modify, change, stop, start, restart) a particular computing system (e.g., operating system, virtual machine, or other platform) into a defined state: a state verification component 830 to verify the results of the automated workflows on the affected state(s) of a service or system; an administrative control component 860 to allow administrative definition and control of workflows, workflow configurations, and automation processes; a user interface component 840 to generate and output a representation of administrative and status data related to the workflows, workflow configurations, and automation processes; and a logging component 870 to record a status of the workflows, workflow configurations, and automation processes.

Figure 9:
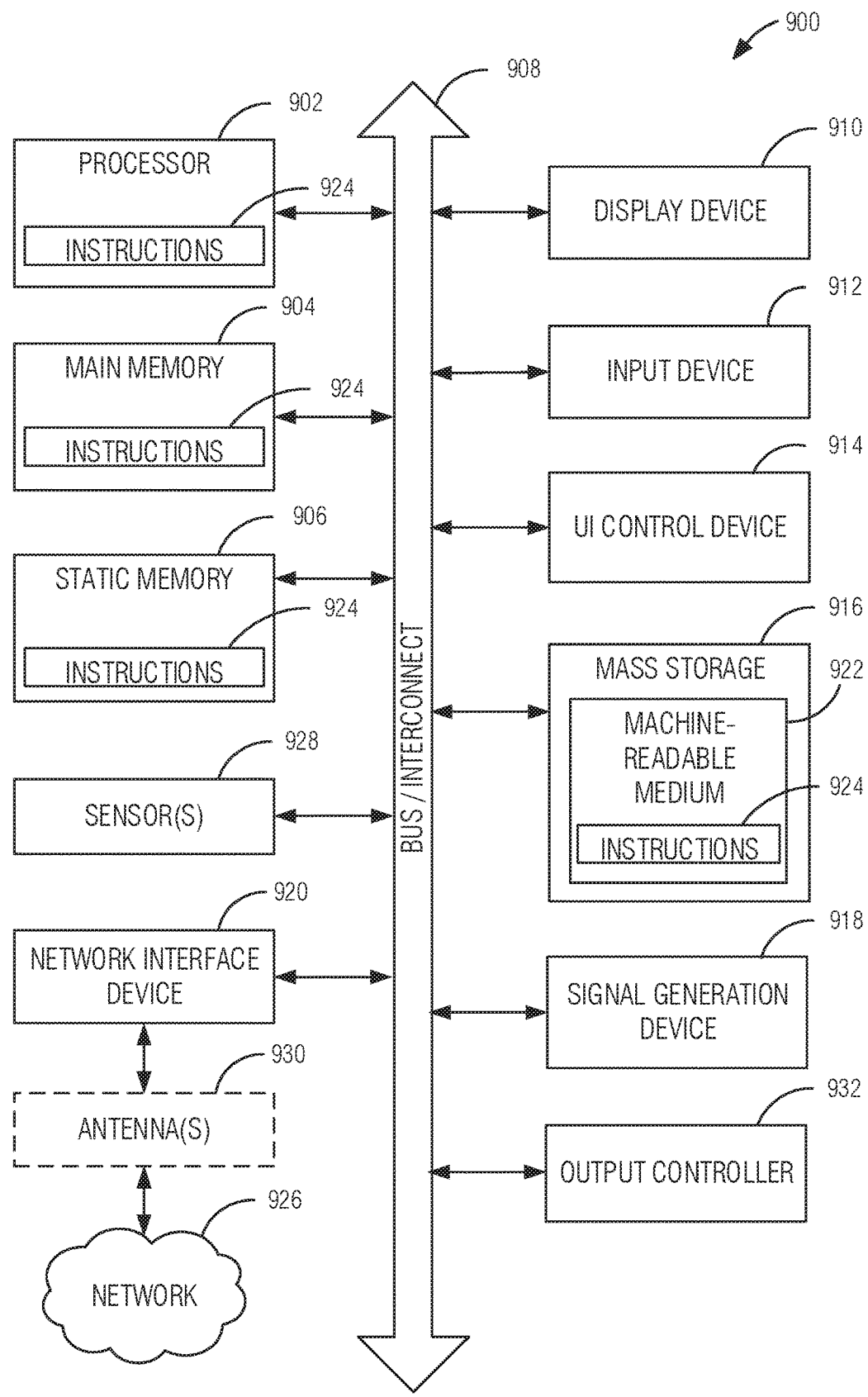
FIG. 9 includes a block diagram for a simplified processing system architecture in which any one or more of the techniques (e.g., operations, processes, methods, and methodologies) discussed herein may be performed, according to an example.

FIG. 9 illustrates a simplified example of a block diagram of a machine 900 upon which any one or more of the techniques discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer or other distributed network environment. The machine 900 may be a personal computer (PC), server computer, computer cluster, web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Thus, the automation and workflow techniques may be applicable to forms of private cloud and cloud-based workloads, among distributed or localized data centers.

Examples, as described herein, may include, or may operate on, logic or any number of components, modules, or mechanisms (including as provided in executable instructions defined by a compiled or interpreted set of software code). Such components are tangible entities capable of performing specified operations when operating, and may be embodied by various software, hardware, or instruction-configured forms. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one component. For example, under operation, the execution units may be configured by a first set of instructions to implement a first component at one point in time and reconfigured by a second set of instructions to implement a second component.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 928, such as a global positioning system (GPS) sensor, compass, accelerometer, or other sensor. The machine 900 may include an output controller 932, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.11 family of standards known as Wi-Fi®, the 3GPP family of standards known as Long Term Evolution (LTE)). IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A computer system comprising:
   at least one processor; and
   memory coupled to the at least one processor and storing instructions that, when executed by the processor, cause the computer system to perform operations with an automation tool set, the operations comprising:
   identifying a maintenance action to be performed on a target computing device, wherein the maintenance action comprises a reboot of an operating system of the target computing device and wherein the maintenance action to be performed is identified from data in a centralized repository for the automation tool set, the centralized repository including configuration information for the target computing device that is obtained from among multiple configuration data sources;
   determining operational states of a plurality of services operated by the target computing device prior to the reboot;
   obtaining an approval condition to proceed with performance of the maintenance action, the approval condition being specified by an administrator;
   automatically initiating the maintenance action on the target computing device, including the reboot, upon obtaining the approval condition, wherein performance of the maintenance action is conducted according to specifications of the maintenance action established in the centralized repository; and
   verifying the operational states of the plurality of services after the reboot.

2. The computer system of claim 1, wherein the reboot restarts an operating system of the target computing device after installation of a software update on the operating system of the target computing device.

3. The computer system of claim 1, wherein the maintenance action is performed as part of a maintenance workflow enacted by the automation tool set, wherein specifications for the maintenance workflow are provided in the centralized repository, and wherein the maintenance workflow includes event tracking for the maintenance action, exception handling for the maintenance action, and notification regarding a status of the maintenance action.

4. The computer system of claim 3, wherein the maintenance workflow further includes use of at least one automation flow established within an orchestration tool, wherein the automation tool set operates independently from the orchestration tool.

5. The computer system of claim 1, wherein the multiple configuration data sources include a configuration management database (CMDB), the operations further comprising:
   populating configuration management information regarding the target computing device, obtained from the CMDB, in the centralized repository, wherein the maintenance action is customized to the target computing device based on the configuration management information, and wherein the data used to perform the maintenance action includes the configuration management information.

6. The computer system of claim 5, wherein the configuration management information regarding the target computing device is additionally provided from at least one other data source of the multiple configuration data sources, being provided from among at least one of: a System Center Configuration Manager (SCCM), a System Center Service Manager (SCSM), an Active Directory server, a System Center Operations Manager (SCOM), or a System Center Orchestrator (SCORCH) runbook.

7. The computer system of claim 1, wherein the centralized repository further tracks the approval condition, the operations further comprising:
   obtaining an approval command from the administrator, received via a user interface, to proceed with performance of the maintenance action.

8. The computer system of claim 1, the operations further comprising:
   determining the operational state after performance of the maintenance action;
   wherein verifying the operational state of the target computing device includes performing remediation on at least one service of the target computing device in response to the operational state indicating a failure of the maintenance action with at least one service of the target computing device.

9. The computer system of claim 1, the operations further comprising:
   generating data to output a status report of the maintenance action, using the configuration information in the centralized repository, the status report indicating the operational state of the target computing device after performance of the maintenance action.

10. A method, comprising a plurality of electronic operations executed with processor circuitry of a computing device, for deploying maintenance actions onto a target computing device, the plurality of electronic operations comprising:
    identifying a maintenance action to be performed on a target computing device, wherein the maintenance action comprises a reboot of an operating system of the target computing device and wherein the maintenance action to be performed is identified from data in a centralized repository, the centralized repository including configuration information for the target computing device that is obtained from among multiple configuration data sources;
    determining operational states of a plurality of services operated by the target computing device prior to the reboot;
    obtaining an approval condition to proceed with performance of the maintenance action, the approval condition being specified by an administrator;

automatically initiating the maintenance action on the target computing device, including the reboot, upon obtaining the approval condition, wherein performance of the maintenance action is conducted according to specifications of the maintenance action established in the centralized repository; and verifying the operational states of the plurality of services after the reboot.

11. The method of claim 10, wherein the maintenance action is performed as part of a maintenance workflow, wherein specifications for the maintenance workflow are provided in the centralized repository, and wherein the maintenance workflow includes event tracking for the maintenance action, exception handling for the maintenance action, and notification regarding a status of the maintenance action.

12. The method of claim 10, the operations further comprising:

populating configuration management information regarding the target computing device, obtained from multiple configuration data sources, in the centralized repository, wherein the maintenance action is customized to the target computing device based on the configuration management information, and wherein the data used to perform the maintenance action includes the configuration management information;

wherein the multiple configuration data sources include at least one of: a configuration management database (CMDB), a System Center Configuration Manager (SCCM), a System Center Service Manager (SCSM), an Active Directory server, a System Center Operations Manager (SCOM), or a System Center Orchestrator (SCORCH) runbook.

13. The method of claim 10, the operations further comprising:

determining the operational state after performance of the maintenance action;

wherein verifying the operational state of the target computing device includes performing remediation on at least one service of the target computing device in response to the operational state indicating a failure of the maintenance action with at least one service of the target computing device.

14. The method of claim 10, the operations further comprising:

generating data to output a status report of the maintenance action, using the configuration information in the centralized repository, the status report indicating the operational state of the target computing device after performance of the maintenance action.

15. A non-transitory machine-readable storage medium, the machine-readable storage medium comprising instructions stored thereon that, when executed by processor circuitry of a computing system, cause the processor circuitry to perform operations comprising:

identifying a maintenance action to be performed on a target computing device, wherein the maintenance action comprises a reboot of an operating system of the target computing device and wherein the maintenance action to be performed is identified from data in a centralized repository, the centralized repository including configuration information for the target computing device that is obtained from among multiple configuration data sources;

determining operational states of a plurality of services operated by the target computing device prior to the reboot;

obtaining an approval condition to proceed with performance of the maintenance action, the approval condition being specified by an administrator;

automatically initiating the maintenance action on the target computing device, including the reboot, upon obtaining the approval condition, wherein performance of the maintenance action is conducted according to specifications of the maintenance action established in the centralized repository; and verifying the operational states of the plurality of services after the reboot.

16. The machine-readable storage medium of claim 15, wherein the maintenance action is performed as part of a maintenance workflow, wherein specifications for the maintenance workflow are provided in the centralized repository, and wherein the maintenance workflow includes event tracking for the maintenance action, exception handling for the maintenance action, and notification regarding a status of the maintenance action.

17. The machine-readable storage medium of claim 15, the operations further comprising:

populating configuration management information regarding the target computing device, obtained from multiple configuration data sources, in the centralized repository, wherein the maintenance action is customized to the target computing device based on the configuration management information, and wherein the data used to perform the maintenance action includes the configuration management information;

wherein the multiple configuration data sources include at least one of: a configuration management database (CMDB), a System Center Configuration Manager (SCCM), a System Center Service Manager (SCSM), an Active Directory server, a System Center Operations Manager (SCOM), or a System Center Orchestrator (SCORCH) runbook.

18. The machine-readable storage medium of claim 15, the operations further comprising:

determining the operational state after performance of the maintenance action;

wherein verifying the operational state of the target computing device includes performing remediation on at least one service of the target computing device in response to the operational state indicating a failure of the maintenance action with at least one service of the target computing device.

19. The machine-readable storage medium of claim 15, the operations further comprising:

generating data to output a status report of the maintenance action, using the configuration information in the centralized repository, the status report indicating the operational state of the target computing device after performance of the maintenance action.

20. A method performed by an automation tool set comprising programming operating on at least one computer system, the method comprising:

establishing a group comprising a plurality of servers requiring maintenance including a reboot operation, wherein each of the plurality of servers operate a plurality of services;

verifying, using the automation tool set, the operational states of the plurality of servers, verifying, using the automation tool set, the operational states of a plurality of services that are available to restart on the plurality of servers;

initiating, using the automation tool set, the reboot operation for the plurality of servers in the group after the verifying step; and after rebooting the plurality of servers in the group, determining, using the automation tool set, the operational states of the plurality of services operating on each of the plurality of servers.

21. The method of claim 20, further comprising the step of performing, based on a detection of a failure operational state in the determining step, a remedial action to restart a particular service on a particular server.

\* \* \* \* \*